United States Patent [19]

Altenpohl et al.

[11] 4,351,087
[45] Sep. 28, 1982

[54] LATCH RELEASE SYSTEM FOR POULTRY CARRIERS

[76] Inventors: William F. Altenpohl, 1315 Robin Hood Rd.; Paul J. Altenpohl, 704 N. Westchester Dr., both of, High Point, N.C. 27260

[21] Appl. No.: 245,214

[22] Filed: Mar. 18, 1981

[51] Int. Cl.³ ............................................. A22C 21/00
[52] U.S. Cl. ................................................... 17/44.1
[58] Field of Search .................. 17/44, 44.1, 44.2, 24, 17/11

[56] References Cited

U.S. PATENT DOCUMENTS 1,641,508  9/1927  Stark ........................................ 17/24
4,094,413  6/1978  Altenpohl et al. .............. 17/44.1 X Primary Examiner—Willie G. Abercrombie
Attorney, Agent, or Firm—Harvey B. Jacobson

[57] ABSTRACT

A latch release force is applied by a signal-controlled plunger on one side of a carrier body through a force transfer lever to a latch element slidably mounted on the other side of the carrier body which pivotally supports a hook held in a latched position by the latch element. The latch element is thereby displaced upwardly to release the hook for downward pivotal displacement and load drop off in response to downward displacement of the plunger producing a tilting moment on the body in the same angular direction as hook displacement.

10 Claims, 4 Drawing Figures

LATCH RELEASE SYSTEM FOR POULTRY CARRIERS

BACKGROUND OF THE INVENTION

This invention relates generally to the load release operation of poultry carriers of the type disclosed in prior U.S. Pat. Nos. 3,132,373, 3,291,303 and 3,781,946, by way of example.

In poultry carriers of the foregoing type, the latch element slidably mounted on the pivotally suspended rod-like carrier body is displaced upwardly on one side of the carrier body to release the hook for downward pivotal displacement on the other side of the body in order to effect load drop off. An upward force was accordingly applied to the latch release arm of the latch element by a signal-controlled piston or armature plunger. In such arrangements, the moments produced on the carrier body by the upward release force and the shifting load on the hook during load drop off, are both in the same body tilting direction augmenting load drop off. It was therefore deemed necessary to locate the latch release plunger mechanism on the same side of the carrier body as the latch element and to operate the mechanism so as to produce an upward operating force directly applied to the release arm of the latch element.

However, it is sometimes desirable to locate the latch release plunger mechanism on the same side of the carrier body from which the hook projects opposite the latch element. Such relative relocation for the release mechanism is preferred, for example, in an installation as disclosed in my prior copending application Ser. No. 158,922, now U.S. Pat. No. 4,317,258, filed June 2, 1980. In such an installation, two laterally spaced carrier bodies are pivotally suspended by offset side suspension links for simultaneous travel along a common conveyor path. The hooks associated with each pair of carriers project from the two carrier bodies toward each other opposite the latch elements so that the associated power operated release mechanisms may be positioned on the remote sides of the carrier bodies. The space between each pair of carriers must therefore be sufficient to avoid load drop off interference between the confronting hooks. To reverse the orientation of the carriers would avoid drop off interference, but would create a problem with the mounting of the power operated release devices between the carriers.

It is, therefore, an important object of the present invention to provide a novel latch release system for poultry carriers of the aforementioned type whereby the power operated release mechanism may be located on the same side of the carrier bodies from which the hooks project without any adverse effect on the tilting of the body during load drop off.

SUMMARY OF THE INVENTION

In accordance with the present invention, the elongated rod-like body of a poultry carrier pivotally suspended from an overhead conveyor pivotally mounts a force transfer lever element vertically spaced above the carrier hook pivotally mounted therebelow by the body. The release arm of the latch element, which is slidably mounted externally on the carrier body and positioned on one side of its longitudinal axis, is engaged by one end portion of the lever element through which an upward displacing force is exerted on the latch element. The other end portion of the lever element is in alignment with the plunger of the signal-controlled, power operated release mechanism located at each load drop off station on that side of each carrier body opposite the latch element. The plunger of the power operated release mechanism is downwardly displaced during a power stroke to exert a downward operating force on the other end portion of the lever element in a direction parallel to the axis of the rod-like carrier body, producing a moment tending to tilt the carrier body in the same angular direction as displacement of the hook by the load when released from the latched position.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING FIGURES

DETAILED DESCRIPTION OF PREFERRED EMBODIMENT

Figure 1:
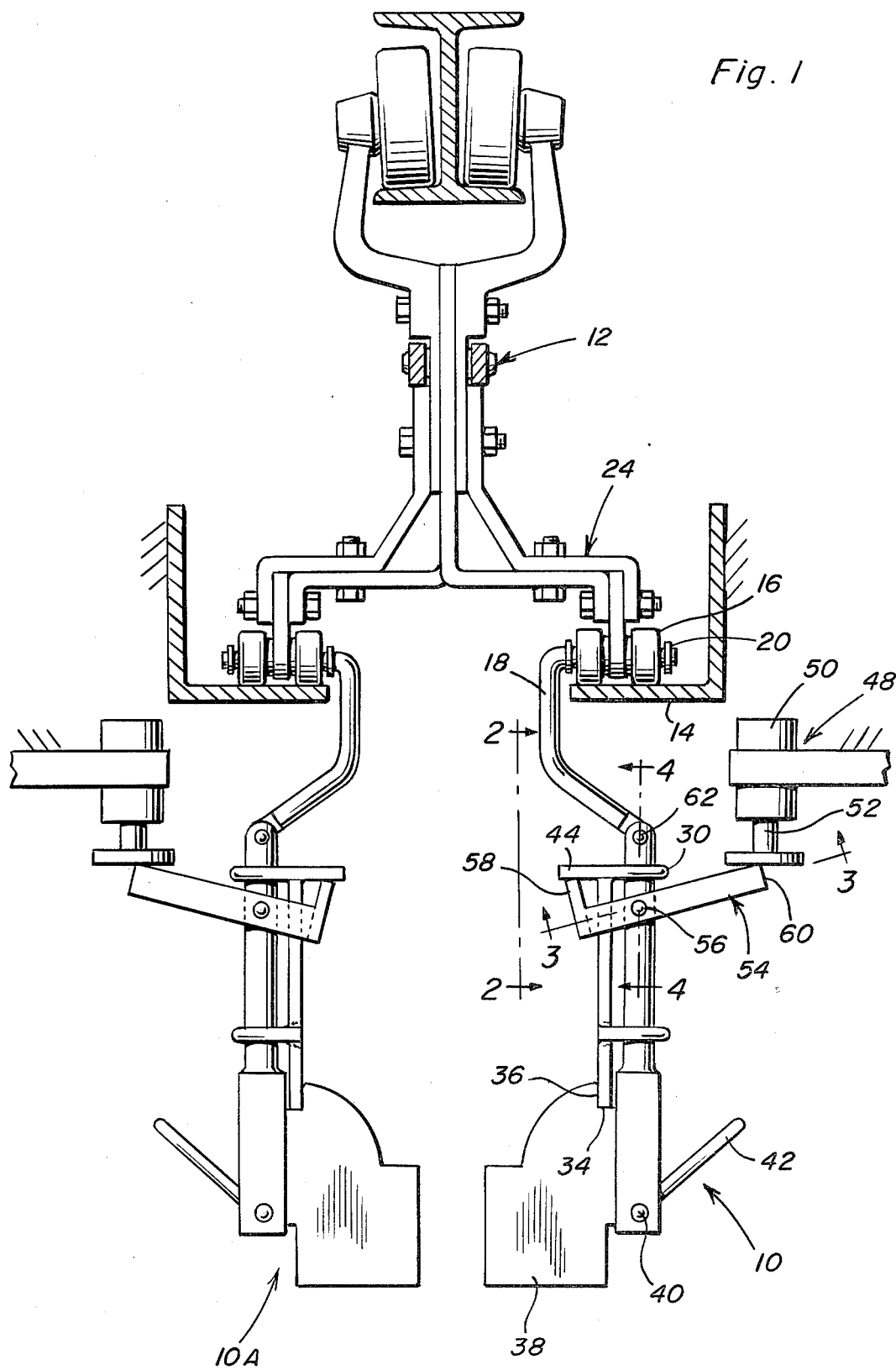
FIG. 1 is a view transverse to the conveyor path of a poultry conveyor system at a load drop off station, showing a typical installation for the present invention.
Figure 2:
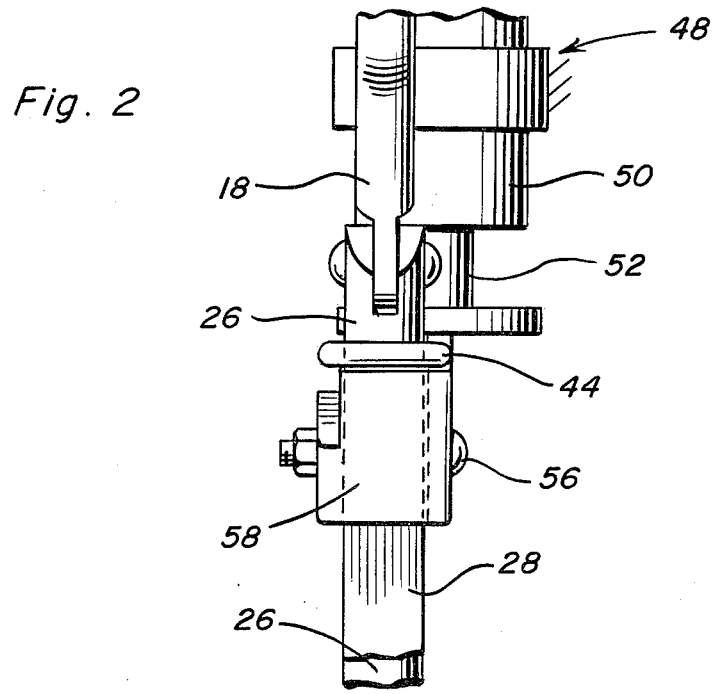
FIG. 2 is a partial side elevation view of a carrier as viewed from a plane indicated by line 2—2 in FIG. 1.
Figure 3:
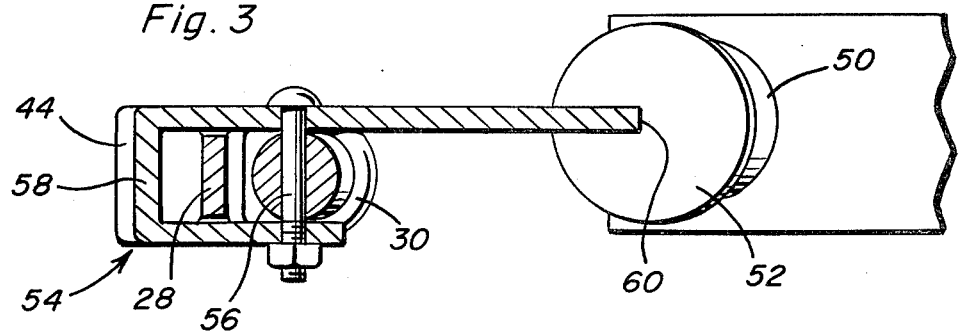
FIG. 3 is an enlarged partial section view taken substantially through a plane indicated by section line 3—3 in FIG. 1.
Figure 4:
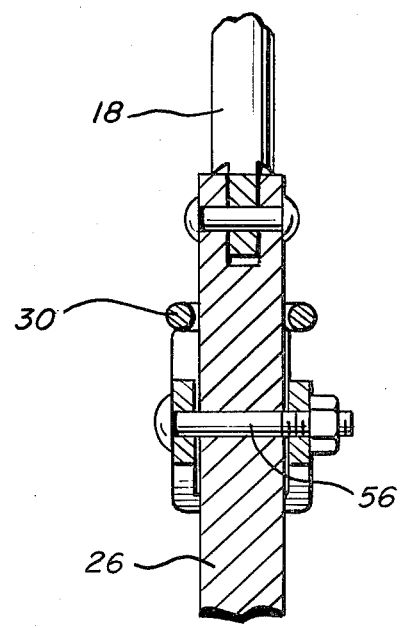
FIG. 4 is an enlarged partial section view taken substantially through a plane indicated by section line 4—4 in FIG. 1.

Referring now to the drawings in detail FIG. 1 illustrates a pair of similar poultry carriers 10 and 10A pivotally suspended from a common overhead conveyor 12 for simultaneous travel along a single conveyor path through one or more drop off stations at which the carriers are supported on fixed track sections 14 by means of roller assemblies 16. Side suspension links 18 pivotally interconnect the carriers with the conveyor through the roller shafts 20 associated with the roller assemblies and the pulling links 22 coupled to the conveyor chain by a bar 24. Such an arrangement is disclosed in our prior copending application Ser. No. 158,922, now U.S. Pat. No. 4,317,258, aforementioned.

Each carrier includes an elongated, rod-like body 26 on which a latch element 28 is slidably mounted, externally, by means of upper and lower loops 30 and 32. The latch element is gravitationally biased to a downward latched position as shown with its lower end 34 received within a notch 36 of a counterweight plate 38 pivotally mounted on the carrier body by a pivot 40. A hook 42 is connected to the counterweight and projects laterally from the geometrical axis of the carrier body 26 at an upward incline as shown, to support a load thereon. A release arm 44 projects laterally from the upper end of the latch element on the side of body 26 opposite the hook 42. The latch element is displaced upwardly by a force applied to release arm 44 in order to withdraw end 34 from notch 36 and permit the hook to pivot downwardly under load about pivot 40. The load will therefore slide off the hook during a load drop off operation as is well-known in the art. Such load drop off produces a moment on the carrier body because of the upward latch releasing force applied to the latch element 28 through arm 44 and the downward pivoting of hook 42. This load drop off moment tends to tilt the carrier body in the same angular direction as displacement of hook 42 so as to accelerate and insure drop off of the load.

Associated with each load drop off station are signal-controlled power operated plunger mechanisms 48. Each mechanism 48 includes a fluid cylinder or electromagnetic device 50 that is fixedly mounted in laterally spaced relation to the common conveyor path. Because of space limitation and mounting requirements, the power operated devices 50 are located on the outside of the carriers 10 and 10A rather than between the carriers. Further, the devices 50 are operatively aligned so that the plungers 52 engage force transfer elements 54 pivotally mounted by pivots 56 on the carrier bodies. During a power stroke, each plunger 52 is displaced downwardly to apply an operating force to the element 54 in a direction parallel to the axis of body 26 along with the latch element is displaceable on the opposite side of the body.

The force transfer element 54 is a lever having opposite end portions 58 and 60 respectively engaging the latch release arm 44 and the plunger 52. It will therefore be apparent that a downward operating force applied by plunger 52 to the lever element 54 will be transmitted to the latch element as an upward latch releasing force to effect load drop off. A moment is produced by such downward operating force on the carrier body through the intermediate pivot 56 of lever element 54 in the same angular displacement of hook 42 from its latched position. The pivot 56 of element 54 and pivot 40 of hook 42 substantially intersect the axis of body 26 perpendicular thereto, as does the pivot 62 between the body 26 and the side suspension link 18. Thus, the orientation of the carriers 10 and 10A with the latch elements on confronting sides of the carrier bodies and the downward direction of the operating forces will effect load drop off without any adverse tilting affect.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with an article carrier having an elongated body pivotally suspended from a moving conveyor, a hook pivotally connected to the body adjacent a lower end thereof, and latch means slidable externally on the body for holding the hook in a latched position projecting laterally from the body in one direction, latch release means engageable with the latch means for exerting an upward latch releasing force thereon, comprising a force transmitting element connected to the body in spaced relation to the hook and engageable with the latch means in laterally spaced relation to the body, and signal controlled power means engageable with the element for exerting a downward operating force on the element laterally spaced from the body opposite the latch means.

2. The combination of claim 1 wherein said element is pivotally mounted on the body intermediate opposite end portions thereof respectively engaging the latch means and the signal-controlled power means.

3. The combination of claim 2 wherein said body has a longitudinal axis perpendicular to a pair of spaced pivot axes about which the hook and the force transmitting element are displaceable, respectively.

4. The combination of claim 1 wherein said body has a longitudinal axis perpendicular to a pair of spaced pivot axes about which the hook and the force transmitting element are displaceable, respectively.

5. An article carrier adapted to be pivotally suspended from a conveyor moving along a predetermined path, including an elongated body having a longitudinal axis, a latch element slidably mounted on said body for displacement substantially parallel to said axis, hook means mounted on said body and projecting laterally from one side of said conveyor path for downward pivotal displacement under load from a latched position tending to tilt the body in one direction, and latch release means exerting an upward displacing force on the latch element for slidable displacement thereof in a latch releasing direction, said latch release means including power operated release means fixedly mounted in operative relation to the conveyor path for exerting a downward release force spaced laterally from said one side of the conveyor path, and force transfer means mounted on the body for engagement by the power operated means to transmit the upward displacing force to the latch element in response to the downward release force exerted thereon producing a moment on the body in said one direction.

6. In combination with a vertically elongated carrier body having a longitudinal axis, a hook pivotally connected to the body from which a load is adapted to be suspended, latch means slidably mounted on the body for holding the hook in a latched position with the load suspended therefrom, and a latch release mechanism exerting an upward latch releasing force on the latch means at a location transversely spaced from the body on one side of the axis opposite the load suspended from the hook, said latch release mechanism including power operated means spaced laterally from the body on said opposite side of the axis for exerting a downward operating force, and force transfer means mounted on the body and engageable by the power operated means for exerting said upward latch releasing force on the latch means in response to the downward operating force.

7. The combination of claim 6 wherein said force transfer means includes a lever element pivotally mounted on the carrier body in spaced relation above the hook and having opposite end portions engageable by the power operated means and the latch means, respectively.

8. In combination with an article carrier having an elongated body suspended from a conveyor, a hook pivotally mounted on the body, latch means slidably mounted externally on the body for holding the hook in a latched position, and power operated release means mounted in operative relation to the conveyor for applying a latch releasing force to the latch means, the improvement residing in force transfer means for transmitting the latch releasing force to the latch means in such a manner as to produce a body tilting moment in the direction of pivotal displacement of the hook from said latched position.

9. The combination of claim 8 wherein said force transfer means includes a lever element pivotally mounted on the body and having opposite end portions respectively engageable with the power operated means and the latch means.

10. The combination of claim 9 wherein said body is a cross-sectionally circular rod having a longitudinal axis, said latch releasing force being applied to and exerted by the lever element along parallel directions and in opposite directional senses at said opposite end portions spaced from the axis of the rod.

* * * * *